United States Patent
Balasubramaniyan et al.

(10) Patent No.: US 11,868,873 B2
(45) Date of Patent: Jan. 9, 2024

(54) CONVOLUTION OPERATOR SYSTEM TO PERFORM CONCURRENT CONVOLUTION OPERATIONS

(71) Applicant: HCL TECHNOLOGIES LIMITED, New Delhi (IN)

(72) Inventors: Prasanna Venkatesh Balasubramaniyan, Chennai (IN); Sainarayanan Gopalakrishnan, Chennai (IN); Gunamani Rajagopal, Chennai (IN)

(73) Assignee: HCL Technologies Limited, New Delhi (IN)

( * ) Notice: Subject to any disclaimer, the term of this patent is extended or adjusted under 35 U.S.C. 154(b) by 385 days.

(21) Appl. No.: 17/136,547

(22) Filed: Dec. 29, 2020

(65) Prior Publication Data

US 2021/0365703 A1  Nov. 25, 2021

(51) Int. Cl.
- *G06N 3/063* (2023.01)
- *G06N 3/04* (2023.01)
- *G06V 10/94* (2022.01)
- *G06F 18/213* (2023.01)

(52) U.S. Cl.
CPC ........... *G06N 3/063* (2013.01); *G06F 18/213* (2023.01); *G06N 3/04* (2013.01); *G06V 10/95* (2022.01)

(58) Field of Classification Search
CPC .......... G06N 3/063; G06N 3/04; G06N 3/045; G06F 18/213; G06V 10/95; G06T 1/20
See application file for complete search history.

(56) References Cited

U.S. PATENT DOCUMENTS

| | | | |
|---|---|---|---|
| 8,442,927 B2 | 5/2013 | Chakradhar | |
| 9,978,014 B2 | 5/2018 | Lupon | |
| 10,586,148 B2* | 3/2020 | Henry | G06N 3/082 |
| 10,643,129 B2* | 5/2020 | Chen | G06N 3/063 |
| 2014/0189404 A1* | 7/2014 | Sur | G06F 1/3209 713/323 |
| 2019/0392020 A1 | 12/2019 | Balasubramaniyan | |
| 2020/0364288 A1* | 11/2020 | Wen | G06V 10/82 |
| 2021/0150306 A1* | 5/2021 | Lin | G06N 3/045 |
| 2021/0357730 A1* | 11/2021 | Han | G06N 3/063 |

OTHER PUBLICATIONS

Design and Implementation of Convolutional Neural Network Accelerator with Variable Layer-by-layer Debugging Songpu Huang, (Year: 2018).*

* cited by examiner

*Primary Examiner* — Dhaval V Patel

(57) ABSTRACT

Disclosed is a convolution operator system comprising a Convolution Neural Network (CNN) reconfigurable engine including a plurality of Mini Parallel Rolling Engines (MPREs) for performing a convolution operation concurrently on an image. An input router receives image data. A controller allocates image data to computing blocks through a set of data flow control blocks. Each computing block produces a convolution output corresponding to each row of the image. The controller allocates a plurality of group having one or more computing blocks to generate a set of convolution output. Further, a pipeline adder aggregates the set of convolution output to produce an aggregated convolution output. An output router transmits either the convolution output or the aggregated convolution output for performing subsequent convolution operation to generate a convolution result for the image data.

13 Claims, 4 Drawing Sheets

CONVOLUTION OPERATOR SYSTEM TO PERFORM CONCURRENT CONVOLUTION OPERATIONS

CROSS-REFERENCE TO RELATED APPLICATIONS AND PRIORITY

This patent application does not claim priority from any application. The present application claims benefit from Indian Complete Patent Application No. 202011021305 filed on 20 May 2020 the entirety of which is hereby incorporated by reference.

TECHNICAL FIELD

The present subject matter described herein, in general, relates to a convolution operator system and more particularly to performing a convolution operation concurrently on an image using a convolution operator system.

BACKGROUND

In recent times, Convolution Neural Network (CNN) technique is finding greater applications in computer vision. The computer vision is used to detect a scene or an object in real time from an image captured by various systems. Example of the various systems include, but not limited to, pedestrian detection, lane detection, autonomous driving, sign board detection, activity detection, and face recognition. In order to detect the object in real time, complex computations need to be performed.

However, there is a limit on computation power of any system. This is because the hardware capabilities of any system cannot be extended in real time. In other words, the computation power is based on one or more available on-chip resources of the Field Programmable Gate Arrays (FPGA) and Application Specific Integrated Circuits (ASIC). Thus, the conventional systems and methodologies perform convolution operation only on the available on-chip resources thereby failing to perform convolution operation in real time. In addition, it has always been a challenge to reduce power usage of the conventional systems and methodologies to implement the CNN technique especially for both 2D and 3D convolution operations.

SUMMARY

Before the present systems and methods, are described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only and is not intended to limit the scope of the present application. This summary is provided to introduce concepts related to systems and methods for performing a convolution operation on an image using a convolution operator system and the concepts are further described below in the detailed description. This summary is not intended to identify essential features of the claimed subject matter nor is it intended for use in determining or limiting the scope of the claimed subject matter.

In one implementation, a convolution operator system for performing convolution operation concurrently on an image is disclosed. The convolution operator system may comprise a Convolution Neural Network (CNN) reconfigurable engine including a plurality of Mini Parallel Rolling Engines (MPREs). Each MPRE includes an input router, a set of data flow control blocks, a set of computing blocks, a controller, a pipeline adder, and an output router. The input router may receive an image data comprising a kernel value and a set of input feature matrices. Each input feature matrix from the set of input feature matrices may comprise a set of rows, wherein each row from the set of rows may comprise a set of input features. The set of data flow control blocks may provide at least a portion of the input features and the kernel value to a set of computing blocks. The set of computing blocks may be configured to perform a convolution operation concurrently on the set of input features based on the kernel value to generate a convolution output that may correspond to each row of each input feature matrix. The controller block may be configured to allocate a plurality of groups comprising one or more computing blocks that may generate a set of convolution output corresponding to the set of rows. Furthermore, each group from the plurality of groups may perform convolution operation concurrently on one of each row of each input feature matrix or the set of rows of the input feature matrix. The controller may allocate the plurality of groups based on the kernel value and the set of computational blocks that are available for the convolution operation. The pipeline adder may be configured to aggregate the set of convolution output when the plurality of groups may be formed to generate an aggregated convolution output. The output router may receive either the aggregated convolution output or the convolution output. The output router may further transmit either the aggregated convolution output or the convolution output to the input router for subsequent convolution operation to generate a convolution result for the image data.

In another implementation, a method for performing a convolution operation concurrently on an image using a convolution operator system is disclosed. In order to perform concurrent convolution operation initially an image data comprising a kernel value and a set of input feature matrices may be received. Further, each input feature matrix from the set of input feature matrices may comprise of a set of rows. Furthermore, each row from the set of rows may comprise of a set of input features. The next step for performing concurrent convolution operation includes allocating a set of data flow control blocks to provide at least a portion of the input features and the kernel value to a set of computing blocks. In one aspect each input feature may be allocated to each computing block, wherein each input feature belongs to one row from the set of rows. In another aspect, a plurality of groups may be formed that may comprise one or more computing blocks from the set of computing blocks. In this condition, each row that may belong to each input feature matrix is allocated to each group of one or more computing blocks. Each group of computing blocks may perform convolution operation concurrently on one of each row of each input feature matrix or the set of rows of the input feature matrix. An aggregation step may be performed when the plurality of groups of one or more computing blocks are formed. The aggregating step may involve aggregating the set of convolution output that corresponding to the set of rows to generate an aggregated convolution output. The next step involves transmitting either the aggregated convolution output or the convolution output to the input router that is used for subsequent convolution operation in order to generate a convolution result for the image data.

BRIEF DESCRIPTION OF THE DRAWINGS

The foregoing detailed description of embodiments is better understood when read in conjunction with the appended drawings. For the purpose of illustrating the disclosure, example constructions of the disclosure are shown in the present document; however, the disclosure is not limited to the specific methods and apparatus disclosed in the document and the drawings.

The detailed description is given with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
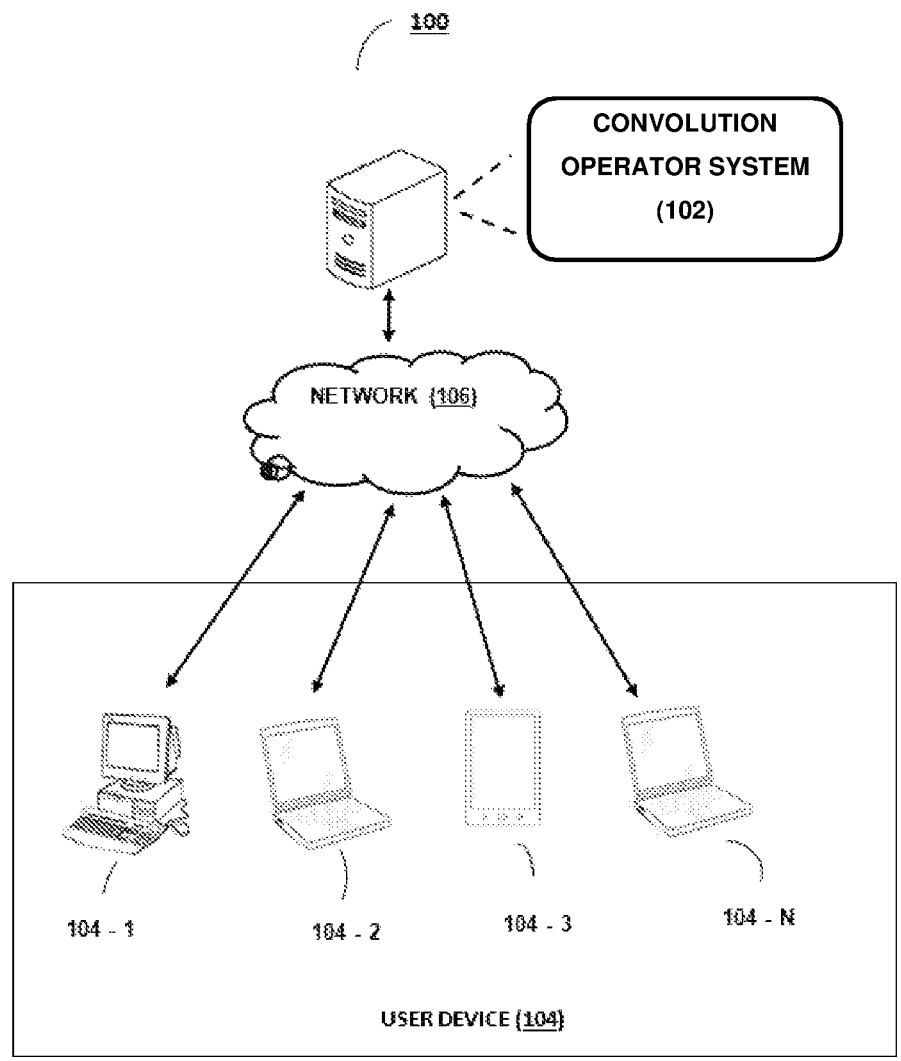
FIG. 1 illustrates a network implementation of a convolution operator system for performing a convolution operation on an image data, in accordance with an embodiment of the present subject matter.

Some embodiments of this disclosure, illustrating all its features, will now be discussed in detail. The words "receiving", "allocating", "aggregating", "transmitting" and other forms thereof, are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated but is to be accorded the widest scope consistent with the principles and features described herein.

The present invention performs a convolution operation concurrently on an image using a convolution operator system. It is to be noted that the convolution operator system utilizes already available on-chip resources of at least Field Programmable Gate Arrays (FPGA) and Application Specific Integrated Circuits (ASIC). Example of the on-chip resources include, but not limited to, registers, Digital Signal Processing (DSP) functional blocks, memory controllers, multipliers, multiplexers, and adders. The present invention focuses on the concept of hardware acceleration using the convolution operator system.

To enhance hardware acceleration, the convolution operator system uses a set of components comprising an input router, a set of data flow control blocks, a set of computing blocks, a controller, a pipeline adder, and an output router. The input router receives an image data comprising a kernel value and a set of input feature matrices. The set of input feature matrices represents a depth of the image data. The kernel value is the set of values that are present in a matrix form that performs the operation of a filter to facilitate feature extraction from an image that needs to be convoluted. The matrix of kernel value may be denoted as a kernel size of the matrix. For example, a value 'n' may represent the kernel size. An input feature matrix from the set of input feature matrices includes input features in matrix layout having size "w*h" wherein "w" corresponds to a width of the feature matrix and "h" corresponds to number of rows in the feature matrix. In one aspect, the set of input features corresponds to a set of pixels. The input router receives at least one row of at least one input feature matrix from the set of input feature matrices and the kernel value that is further transferred to the set of computing blocks.

Each row of the input feature matrix comprises the set of input features, corresponding to the width of the input feature matrix. Each input feature is convoluted by computing block based on the kernel value on the input feature. The set of data flow control blocks provide at least a portion of the input features and the kernel value to the set of computing blocks. The set of computing blocks performs convolution operation concurrently on the set of input features to generate a convolution output. The allocation of the input features to the set of computing blocks is performed based on instructions received from the controller. In first aspect, when the number of computing blocks is equal to the number of input features of each row, the controller transmits each input feature and the kernel value to each computing block. The set of computing block perform convolution operation concurrently to generate a convolution output. The convolution output corresponds to one row of the input feature matrix.

In second aspect, the input router receives a set of rows, wherein each set of rows corresponds to each input feature matrix from the set of input feature matrices. The controller then groups the set of computing blocks into one or more computing blocks. Each group of one or more computing blocks corresponds to each row of each input feature matrix and perform convolution operation concurrently on each row of each input feature matrix. For example, if the input router receives two input feature matrix of size 64*64 and the set of computing blocks available to perform convolution operation is 128. Here the depth of the image data received is 2 whereas 64*64 represents the width and height of the input feature matrix respectively. The controller then groups the computing blocks into two groups of 64 computing blocks. The controller then transmits the kernel value and each row to each group.

In third aspect, the input router receives a set of rows belong to the input feature matrix. The controller then groups the set of computing blocks into one or more computing blocks. Each group of one or more computing blocks corresponds to each row of the input feature matrix and perform convolution operation concurrently on each row of each input feature matrix. For example, if the input router receives input feature matrix of size 64*64 and the set of computing blocks available to perform convolution operation is 128. Here the depth of the image data received is 1 whereas 64*64 represents the width and height of the input feature matrix respectively. The controller then groups the computing blocks into two groups of 64 computing blocks. Two rows of the input feature matrix are transferred to each group of the computing blocks. The controller then transmits the kernel value and each row to each group.

In fourth aspect, the second and third allocation aspects may be performed simultaneously. For example, the controller may receive two input feature matrices of size 64*64 and the set of computing blocks to perform the convolution operation is 256. Here, the controller groups the computing blocks into four groups comprising 64 blocks each. The controller may either allocate two rows of each input feature matrix to four groups of computing blocks or it may allocate four rows of one input feature matrix.

Further, the convolution operation is performed concurrently by each group of one or more computing blocks to generate the convolution output for each row based on the kernel value. Subsequent to generation of the convolution output corresponding to each row of each input matrix, the pipeline adder aggregates the set of convolution output to generate an aggregated convolution output.

In one implementation, the input router receives one row of each input feature matrix and the number of input features of the one row is less than the number of computing blocks. The controller may shut down one or more computing blocks from the set of computing blocks that may not be required to perform the convolution operation. For example, if the width of the input feature matrix is 1024 and the number of computing blocks are 1280, the controller may shut down the remaining 256 computing blocks during the convolution operation. Here the width of the input feature matrix corresponds to number of input features. The operation of shutting down the computing blocks by the controller facilitates reduction in power consumption of the convolution operator system.

After performing the convolution operation concurrently, the output router receives either the aggregated convolution output or the convolution output from the set of computing blocks. The output router further transmits either the aggregated convolution output or the convolution output to the input router for subsequent convolution operation. This process is repeated further to generate a final convolution output for the image data. In one embodiment, multiple instances of convolution operator system may be used to perform the convolution operation concurrently. Here, each row of the input feature matrix may be transferred to each instance of convolution operator system. Multiple instances of the convolution operator system may enhance in hardware acceleration for performing convolution operation concurrently.

While aspects of described system and method for performing the convolution operation concurrently on the image using the convolution operator system and may be implemented in any number of different computing systems, environments, and/or configurations, the embodiments are described in the context of the following exemplary reconfigurable convolution engine.

Referring now to FIG. 1, a network implementation 100 of a convolution operator system 102 for performing a convolution operation is disclosed. In one embodiment, the convolution operator system 102 may receive image data pertaining to an image from a user device 104 via a network 106. The image data may comprise a kernel value and a set of input feature matrices. Each input feature matrix from the set of input feature matrices comprise of set of input features. The input features correspond to a width of the input feature matrix. In one embodiment, the set of input features may be a set of pixels.

The convolution operator system 102 may allocate the received input features to a set computing blocks based on aspects explained subsequently. In first aspect, if the received input features belong to one row of each input feature matrix then the convolution operator system 102 may allocate each input feature to each computing block from the set of computing blocks. Further, the set of computing blocks perform convolution operation concurrently based on kernel value received to generate a convolution output. The convolution output may correspond to the received one row of the input feature matrix. In second aspect, if the received input features belong to a set of rows, then convolution operation system 102 may form a plurality of groups comprising one or more computing blocks. Each group of the plurality of groups may correspond to each row belonging to each input feature matrix. In one embodiment, the set of rows may belong to one input feature matrix. Here each group of the plurality of groups may correspond to each row of the input feature matrix.

It is to be noted that each group is configured to perform convolution operation concurrently on each row to generate a set of convolution output. The convolution operation may be performed based on the kernel value. In this aspect, the convolution operator system 102 may aggregate the set of convolution output to generate an aggregated convolution output.

The convolution operator system 102 may generate a convolution result by performing subsequent convolution operations on the convolution output or the aggregated convolution output. The convolution result may be transmitted by the convolution operator system 102 back to the user device 104 via network 106.

Although the present subject matter is explained considering that the convolution operator system 102 is implemented on a server, it may be understood that the convolution operator system 102 may also be implemented in a variety of computing systems, such as a laptop computer, a desktop computer, a notebook, a workstation, a mainframe computer, a server, a network server, embedded hardware platform board, reprogrammable device platform and the like. In one implementation, the convolution operator system 102 may be implemented over a cloud network. Further, it will be understood that the convolution operator system 102 may be accessed by multiple users through one or more user devices 104-1, 104-2 . . . 104-N, collectively hereinafter referred to as user device 104, or applications residing on the user device 104. Examples of the user device 104 may include, but are not limited to, a portable computer, a personal digital assistant, a handheld device, and a workstation. The user device 104 may be communicatively coupled to the convolution operator system 102 through a network 106.

In one implementation, the network 106 may be a wireless network, a wired network or a combination thereof. The network 106 may be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

Figure 2:
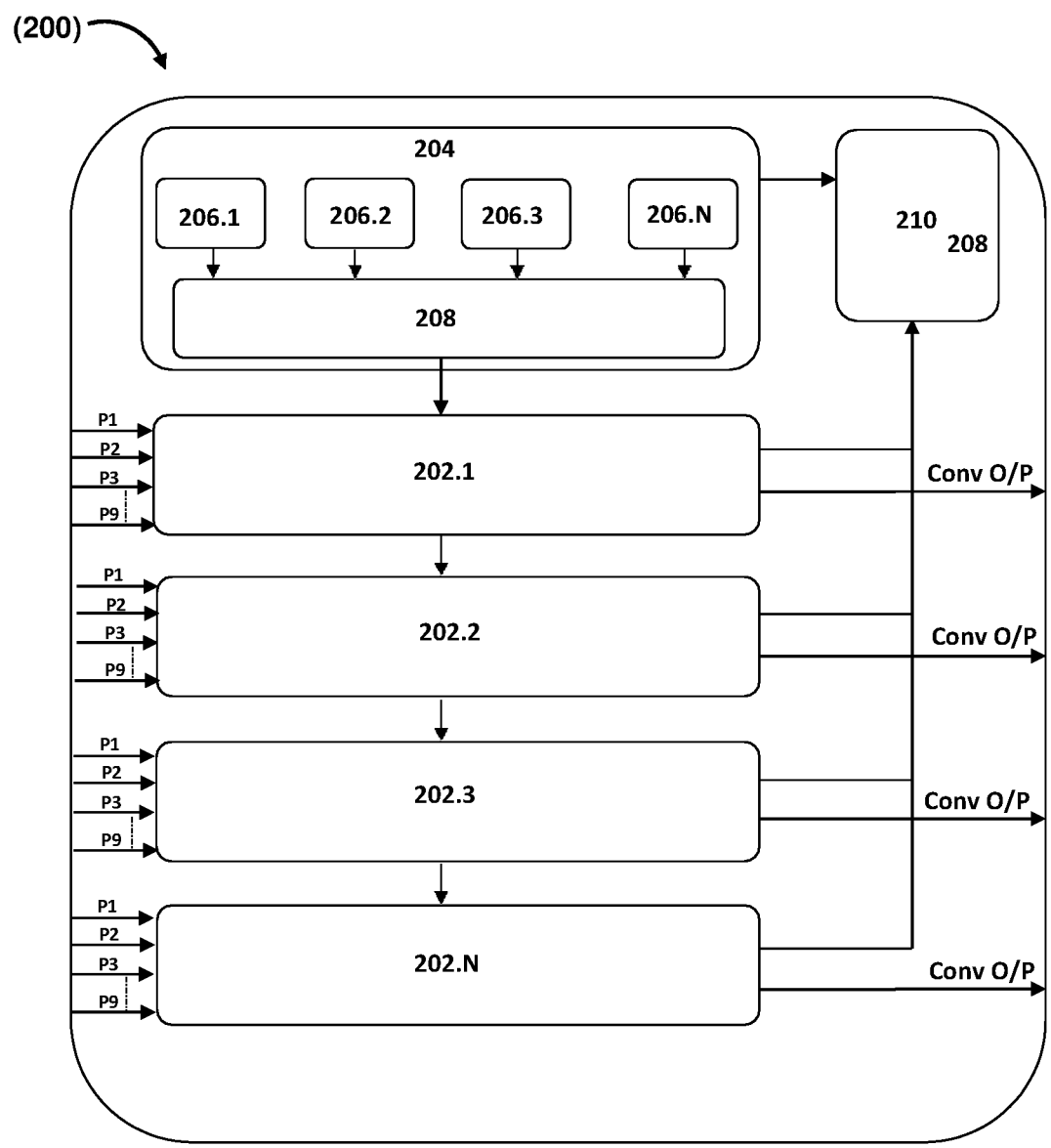
FIG. 2 illustrates a hardware implementation of a convolution operator system for performing a convolution operation on an image data, in accordance with an embodiment of the present subject matter.

Referring now to FIG. 2, a hardware implementation of a convolution operator system 102 for performing a convolution operation concurrently on an image is disclosed. The convolution operator system 102 may be configured to utilize on-chip resources of at least one of Field Programmable Gate Arrays (FPGA) and Application Specific Integrated Circuits (ASIC). The on-chip resources may comprise a Convolutional Neural Network (CNN) reconfigurable engine 200. The CNN reconfigurable engine 200 may comprise multiple Mini Parallel Rolling Engines 202.1 through 202.N (collectively referred as 202). The MPREs 202 receive input Kernel value from Kernel memory 204. The Kernel memory includes Kernel memory blocks 206.1 through 206.N (collectively referred as 206). Each of the Kernel memory blocks 206 holds a predefined number of values. A Kernel controller 208 connected to the Kernel memory blocks 206 may read the values stored in the Kernel memory blocks 206 and may provide such values to the MPREs 202. In addition to receiving the values from the Kernel memory blocks 206, the MPREs 202 may also receive input feature map data from Input Line Buffer i.e. respective FMM_BANK (P1 through P9). Thereupon, the entire MPRE instance may be started so that the Convolution operation occurs for one full feature map. Convoluted data for one feature map may be provided to an output line buffer.

In one case, a maximum kernel size in the design could be 9×9 which is effectively 81 values. Therefore, individual kernel memories could store 81 values. The number of kernel memory instance depends on the maximum possible kernel in the respective network. An exemplary network may include 5 layers, and layer3 may have a maximum of 256 kernels of size 3×3. In such case, the Kernel memory space shall have 16 small memories (to process 1 feature map) where each individual memory will hold 3×3=9 values. So Kernel memory space in each CNN reconfigurable engine instance will have a maximum of 16 memories (i.e. 16×16=256) and CNN reconfigurable engine could run concurrently to generate 16 input features from the layer3.

The convolution operator system 102 also includes a CNN engine local controller 210 for providing centralized control to all the MPREs 202. Using the CNN Engine local controller 210, status of all the MPREs 202 and failures from all the MPREs 202 could be monitored. The CNN engine local controller 210 auto-triggers functional safety mechanisms within the set of computing blocks 306, when a user defined set temperature limit is reached. The CNN engine local controller 210 also allows to shut-off one or more MPREs 202 when the input feature map size is less than number of MPREs 202.

Figure 3:
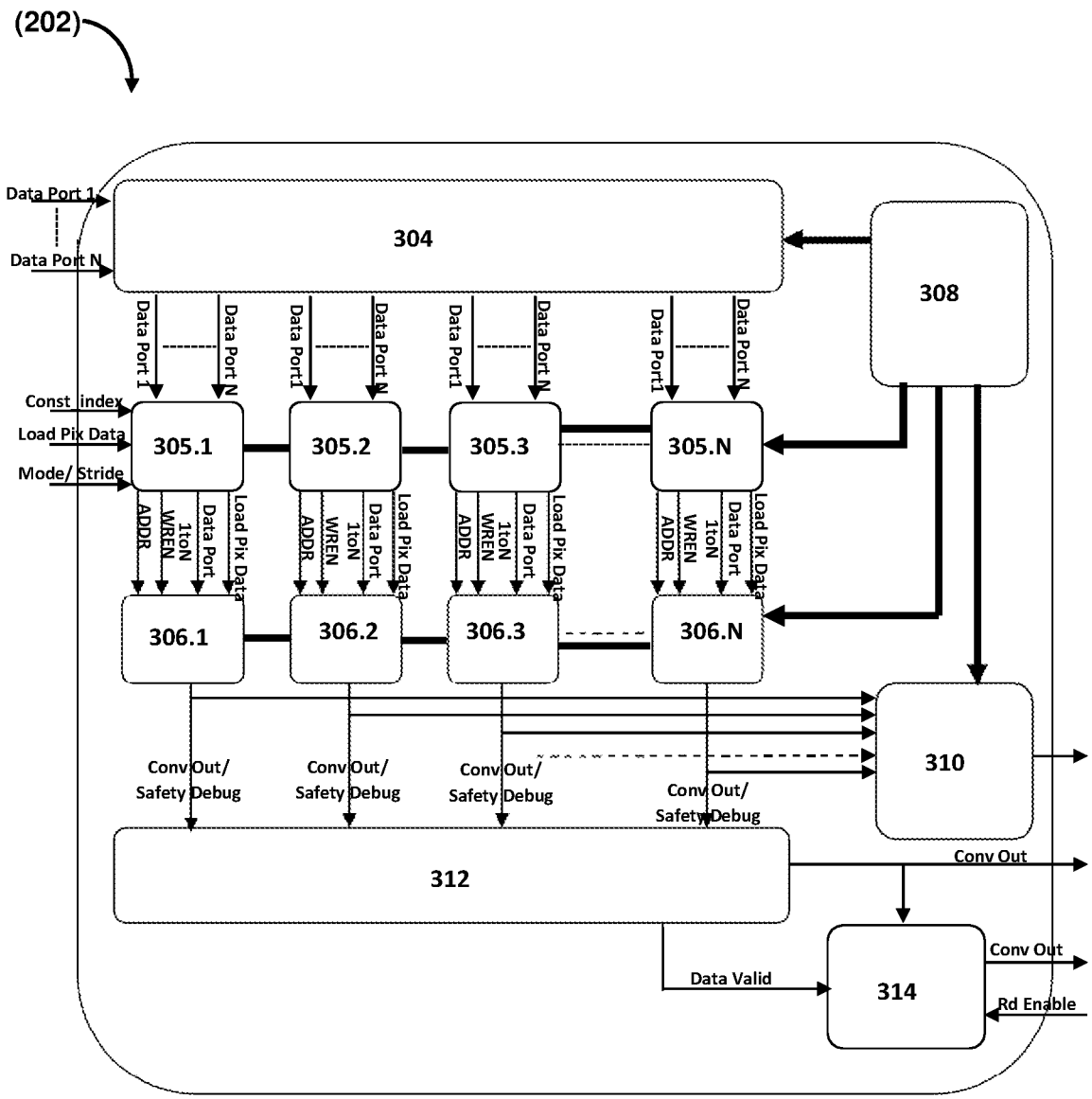
FIG. 3 illustrates architecture of a Mini Parallel Rolling Engine (MPRE), in accordance with an embodiment of the present subject matter.

Referring now to FIG. 3, architecture of the MPREs 202 is described. an input router 304, a set of data flow control blocks 305.1 to 305.N (collectively referred as a set of data flow control blocks 305), a set of computing blocks 306.1 to 306.N (collectively referred as a set of computing blocks 306), a controller 308, a pipeline adder 310, an output router 312, and a debug register 314.

The on-chip resources may enable the convolution operator system 102 to communicate with other computing devices, such as web servers and external data servers (not shown). The on-chip resources can facilitate multiple communications within a wide variety of networks and protocol types, including wired networks, for example, LAN, cable, etc., and wireless networks, such as WLAN, cellular, or satellite. An interface (not shown) may be a bus interface configured to execute a protocol for data transfer between an image source and the convolution operator system 102. It is to be understood that a user may interact with the convolution operator system 102 via the interface. The interface may include a variety of software and hardware interfaces, for example, a web interface, a graphical user interface, and the like. The interface may allow the convolution operator system 102 to interact with the user directly or through other user devices 104.

Further, the interface may include one or more ports for connecting several devices to one another or to another server. In an implementation, the interface may facilitate on-chip communication by implementing on-chip bus protocols including, but not limited to, Advanced Microcontroller Bus Architecture (AMBA) Advanced High-Performance bus (AHB) and Advanced Extensible Interface (AXI), Wishbone Bus, Open Core Protocol (OCP) and Core Connect Bus. In other implementation, the interface may facilitate off-chip communication by implementing off-chip bus protocols including, but not limited to, Universal Serial Bus (USB), Peripheral Component Interconnect Express (PCIe), and any other high-speed interfaces.

The input router 304 may be a type of decentralized router to enable a flexible communication with the image source via the interface. In one embodiment, the image source may be a user device 104. The input router 304 may receive an image data comprising set of input features and a kernel value. In one embodiment, the set of input features may be a set of pixels. The kernel value comprises a matrix having a total number of 'n' elements. For example, if the kernel value of the matrix may be a 3*3 matrix, then the total number of elements is 9. The total number of elements denote a kernel size of 9. The input router 304 further transmits the received image data to the set of computing blocks 306 through the set of data flow control blocks 305. The set of data flow control blocks 305 will use a STRIDE signal to perform pixel skipping and load only required pixels of the image data into the set of computing blocks 306.

The controller 308 may be operatively connected to the input router 304, the set of computing blocks 306 and the pipeline adder 310. The image data collected by the input router 304 through Data Port 1 to Data Port N may be transferred to the set of data control blocks 305. The controller 308 may perform allocation operation of the image data to the set of computing blocks 306 through the set of data flow control blocks 305. Along with the image data, configuration data including Kernel values, parameter for BIAS/Activation function, and Layer Depth information may be provided to the set of data flow control blocks 305. Further, control data including Mode, Stride, Const_Index, Layer combine, and Bypass may also be provided to the set of data flow control blocks 305.

In one aspect, each input feature from the set of input features may be allocated to each computing block from the set of computing blocks 306. In one implementation, the data received by the set of computing blocks 306 would include Pixel data, data present in Data Port 1 to Data Port N, Write Enable (WREN), and Address (ADDR) information. The set of computing blocks 306 may operate concurrently to produce the convolution output corresponding to each row of each input feature matrix. Each computing block may perform convolution operation on each input feature based on the kernel value received. For example, if the input router 304 receives an image data with a width of 128 and the number of computing blocks available are 128, then the controller 308 allocates each input feature to each computing block.

In another aspect, the controller 308 may allocate a plurality of groups comprising one or more computing blocks present in the set of computing blocks 306. The plurality of groups may be configured to generate a set of convolution output corresponding to the set of rows. Each group from the plurality of groups perform convolution operation concurrently on each row of each input feature matrix. The plurality of groups may be allocated based on the kernel value and the set of computing blocks available for the convolution operation to be performed. For example, if the set of input feature matrices is 100, assuming some of input feature matrices of size 64*64 and the number of computing blocks as 128. In this scenario, the controller 308 may group the set of computing blocks 306 into 2 groups each of 64 computing blocks. Each group may receive each row of the two input feature matrices. Each row then may be convoluted concurrently to generate a set of convolution output.

In yet another aspect, the controller 308 may shut down at least one computing block when the number of input features is less than the number of the set of computing blocks 306. For example, if the received input features are 1024 in number and the number of computing blocks available are 1280. Then, the controller 308 shuts down the remaining 256 computing blocks that are not required to perform the convolution operation.

For power intensive application requirements, power or clock of the set of computing blocks 306 will be turned-off whenever necessary. In case of Application Specific Integrated Circuit (ASIC) implementation, power of individual block of the set of computing blocks 306 will be turned-off, with appropriate power gating techniques. In case of Field-Programmable Gate Array (FPGA) implementation, element clock of individual block of the set of computing blocks 306 will be turned-off.

The pipeline adder 310 may operatively be connected to the controller 308. The pipeline adder 310 may be configured to receive the set of convolution output when the plurality of group is formed. The pipeline adder 310 may aggregate the received set of convolution output to generate an aggregated convolution output. Examples of the pipeline adder 310 may include, but not limited to, a Ripple Carry Adder (RCA), a Carry Skip Adder (CSkA), a Carry Increment Adder (CIA), a Carry Look Ahead Adder (CLA), a Carry Save Adder (CSA), a Carry Select Adder (CslA) and a Carry Bypass Adder (CBA).

The output router 312 receives either the convolution output or the aggregated convolution output (illustrated as Cony Out/Safety Debug) from the set of computing blocks 306. Upon receipt of the convolution output or the aggregated convolution output, the output router 312 may further transmit either the aggregated convolution output or the convolution output to an external memory. The external memory may comprise of any computer-readable medium or computer program product known in the art including, for example, volatile memory, such as Static Random-Access Memory (SRAM) and Dynamic Random-Access Memory (DRAM), and/or non-volatile memory, such as read only memory (ROM), erasable programmable ROM, flash memories, hard disks, optical disks, and magnetic tapes. Further, the output router may be configured to transmit either the aggregated convolution output or the convolution output to the input router 304 for subsequent convolution operation in order to generate a convolution result for the image data.

The convolution operator system 102 may further comprise a debug register 314 configured to perform layer wise debugging on the set of convolution output (Cony Out) based on a Data Valid signal and a Read Enable signal.

In one embodiment, a set of convolution operator systems may operate concurrently on image data received from the image. For example, if the input feature matrix is of size 1280*640 the number of rows correspond to 640. Considering 640 convolution operator systems available for the convolution operation, the set of rows based on the kernel size may be transferred to each convolution operator system 102. Each convolution operator system 102 may generate a convolution result for the received row of the input feature matrix. Further, the convolution result may be combined by the set of convolution operator system to generate a combined convolution result for the input feature matrix. The above convolution operation may be repeated for each input feature matrix from the set of input feature matrices.

Figure 4:
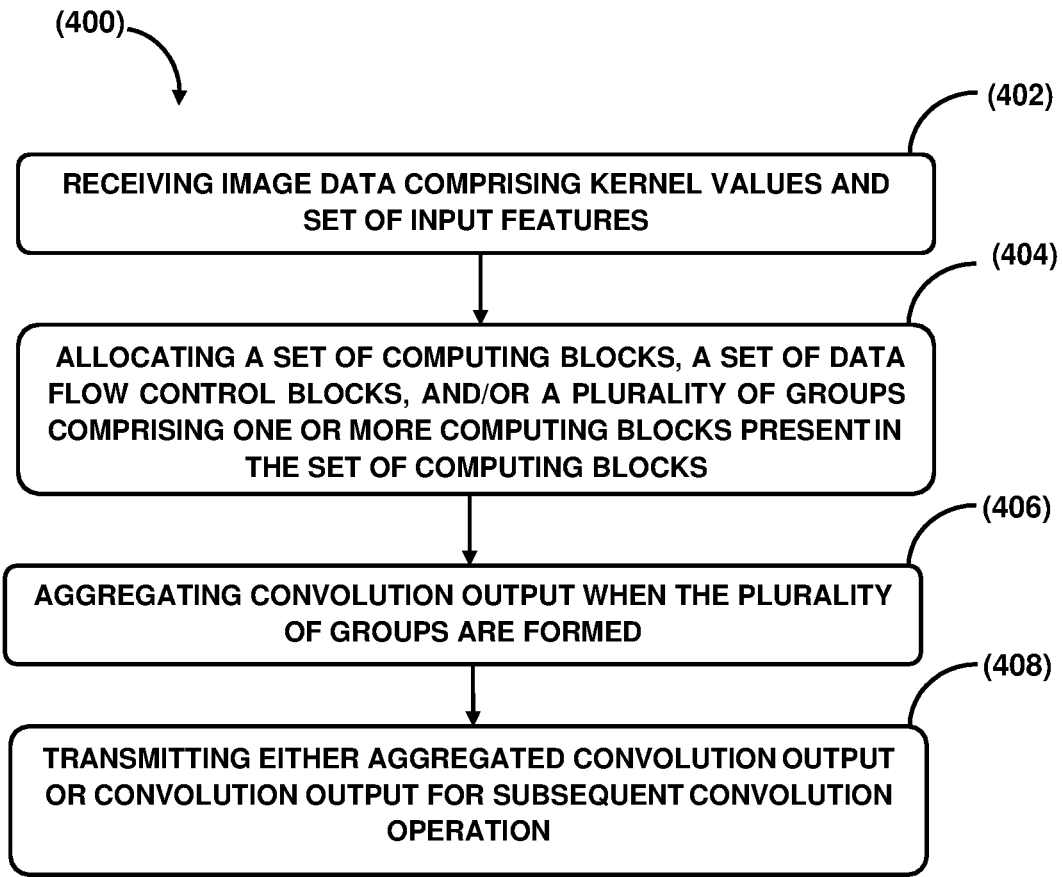
FIG. 4 illustrates a method for performing a convolution operation concurrently on an image data by using a convolution operator system, in accordance with an embodiment of the present subject matter.

Referring now to FIG. 4, a method 400 for performing a convolution operation concurrently on an image using a convolution operator system is shown, in accordance with an embodiment of the present subject matter. The method 400 may be described in the general context of computer executable instructions. Generally, computer executable instructions can include routines, programs, objects, components, data structures, procedures, modules, functions, etc., that perform functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternate methods. Additionally, individual blocks may be deleted from the method 400 without departing from the spirit and scope of the subject matter described herein. Furthermore, the method can be implemented in any suitable hardware, software, firmware, or combination thereof. However, for ease of explanation, in the embodiments described below, the method 400 may be implemented as described in the convolution operator system 102.

At block 402, image data may be received for performing a convolution operation concurrently on an image by using a convolution operator system 102. In one implementation, the image data may be received by an input router 304.

At block 404, a set of computing blocks 306 may be allocated to perform the convolution operation concurrently on the set of input features. In first aspect, the set of input features may correspond to each row of each input feature matrix. The set of input features may be provided to the one or more blocks of the set of computing blocks by a set of flow control blocks. The set of flow control blocks may operate based on a STRIDE signal. Each computing block from the set of computing blocks 306 performs convolution operation concurrently on each input feature based on the kernel value received. The concurrent convolution operation results in a convolution output. In second aspect, a set of input features may correspond to a set of rows. Each row from the set of rows correspond to a feature matrix from the set of feature matrices. In this scenario, plurality of groups comprising one or more computing blocks from the set of computing blocks 306 may be formed. Each group may correspond to each row. Each group generates a set of convolution output corresponding to each row. In one implementation, the set of input features may be allocated to the set computing blocks by a controller 308.

At block 406, the set of convolution output corresponding to the set of rows may be aggregated when the plurality of groups is formed to generate an aggregated convolution output. In one implementation, the aggregation of the convolution output may be performed by a pipeline adder 310.

At block 408, the convolution output or the aggregated convolution output may be transmitted to the input router 304 for subsequent convolution operation in order to generate a convolution result for the image data. In one implementation, the convolution output or the aggregated convolution output may be transmitted by an output router 312.

Exemplary embodiments discussed above may provide certain advantages. Though not required to practice aspects of the disclosure, these advantages may include those provided by the following features.

Some embodiments enable a system and a method to perform 2D or 3D convolution operations concurrently.

Some embodiments enable a system and a method to enhance processing power of the available on chip resources by concurrently performing convolution operations.

Some embodiments enable a system and a method to reuse same resource for one or more convolution layer.

Some embodiments enable a system and a method to reconfigure the convolution operator system based on various kernel sizes.

Some embodiments enable a system and a method to reduce power consumption of the convolution operator system by switching off the unused computing blocks during performance of convolution operation concurrently.

Although implementations for methods and systems for performing a convolution operation on an image using a convolution operator system have been described in language specific to structural features and/or methods, it is to be understood that the appended claims are not necessarily limited to the specific features or methods described. Rather, the specific features and methods are disclosed as examples of implementations for performing a convolution operation concurrently on an image using the convolution operator system.

We claim:

1. A convolution operator system for performing convolution operation concurrently on an image, the convolution operator system comprising:
    a Convolution Neural Network (CNN) reconfigurable engine including a plurality of Mini Parallel Rolling Engines (MPREs), wherein each MPRE includes:
        an input router configured to receive image data comprising a kernel value and a set of input feature matrices, wherein each input feature matrix from the set of input feature matrices comprises a set of rows, and wherein each row from the set of rows comprises a set of input features;
        a set of data flow control blocks configured to provide at least a portion of the input features and the kernel value to a set of computing blocks;
        the set of computing blocks configured to perform a convolution operation concurrently on the set of input features in order to generate a convolution output corresponding to each row of each input feature matrix, wherein each computing block of the set of computing blocks performs the convolution operation based on the kernel value;
        a controller configured to allocate a plurality of groups in order to generate a set of convolution output corresponding to the set of rows, wherein each group from the plurality of groups comprises one or more computing blocks of the set of computing blocks, wherein each group performs convolution operation concurrently one of (a) each row of each input feature matrix or (b) the set of rows of the input feature matrix, and wherein the plurality of groups is allocated based on the kernel value and the set of computing blocks available for the convolution operation to be performed;
        a pipeline adder configured to generate an aggregated convolution output based on the set of convolution output when the plurality of groups is formed; and
        an output router configured to receive either the aggregated convolution output or the convolution output, wherein the output router is further configured to transmit either the aggregated convolution output or the convolution output to the input router for subsequent convolution operation in order to generate a convolution result for the image data.

2. The convolution operator system as claimed in claim 1, wherein the controller shuts down at least one computing block from the set of computing blocks when number of the input features is less than the number of the set of computing blocks available.

3. The convolution operator system as claimed in claim 1, wherein the set of input features corresponds to a set of pixels.

4. The convolution operator system as claimed in claim 1, further comprising a debug register configured to perform layer wise debugging on the set of convolution output.

5. The convolution operator system as claimed in claim 1, further comprises a localized kernel memory to store multiple filter kernels and network parameters, for concurrent feature map processing.

6. The convolution operator system as claimed in claim 1, further comprising a Convolutional Neural Network (CNN) engine local controller for auto-triggering of functional safety mechanisms within the set of computing blocks, when a user defined set temperature limit is reached.

7. The convolution operator system as claimed in claim 1, wherein the CNN engine local controller allows to shut-off one or more MPREs when the input feature map size is less than number of MPREs.

8. A method for performing a convolution operation concurrently on an image using a convolution operator system, the method comprising:
    receiving, by an input router, image data comprising a kernel value and a set of input feature matrices, wherein each input feature matrix from the set of input feature matrices comprise of a set of rows, and wherein each row from the set of rows comprises a set of input features;
    allocating, by a controller, a set of data flow control blocks to provide at least a portion of the input features and the kernel value to a set of computing blocks;
    the set of computing blocks to perform a convolution operation concurrently on the set of input features in order to generate a convolution output corresponding to each row of each input feature matrix, wherein each computing block of the set of computing blocks performs convolution operation on each input feature based on the kernel value received, and
    a plurality of groups comprising one or more computing blocks present in the set of computing blocks in order to generate a set of convolution output corresponding to the set of rows, wherein each group from the plurality of groups perform convolution operation concurrently on one of (a) each row of each input feature matrix or (b) the set of rows of the input feature matrix, and wherein the plurality of groups is allocated based on the kernel value and the set of computing blocks available for the convolution operation to be performed;

aggregating, by a pipeline adder, the set of convolution output corresponding to the set of rows when the plurality of groups is formed to generate an aggregated convolution output; and transmitting, by an output router, either the aggregated convolution output or the convolution output to the input router for subsequent convolution operation in order to generate a convolution result for the image data.

9. The method as claimed in claim 8, wherein the controller shuts down at least one computing block from the set of computing blocks when number of the input features is less than the number of computing blocks.

10. The method as claimed in claim 8, wherein the set of input features corresponds to a set of pixels.

11. The method as claimed in claim 8, wherein a debug register performs layer wise debugging on the set of convolution output.

12. The method as claimed in claim 8, wherein a localized kernel memory stores multiple filter kernels and network parameters, for concurrent feature map processing.

13. The method as claimed in claim 8, wherein a Convolutional Neural Network (CNN) engine local controller for auto-triggering of functional safety mechanisms within the set of computing blocks, when a user defined set temperature limit is reached.

* * * * *